United States Patent
Ogawa

(10) Patent No.: US 7,746,752 B2
(45) Date of Patent: Jun. 29, 2010

(54) SERVO CONTROLLING METHOD OF OPTICAL INFORMATION PROCESSING APPARATUS AND OPTICAL INFORMATION RECORDING AND REPRODUCING APPARATUS

(75) Inventor: Katsuhisa Ogawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 592 days.

(21) Appl. No.: 11/563,387

(22) Filed: Nov. 27, 2006

(65) Prior Publication Data

US 2007/0147200 A1 Jun. 28, 2007

(30) Foreign Application Priority Data

Nov. 29, 2005 (JP) ............................. 2005-344370

(51) Int. Cl.
G11B 7/00 (2006.01)
(52) U.S. Cl. ................ 369/103; 369/44.37; 369/112.28; 369/112.16
(58) Field of Classification Search ........................ None
See application file for complete search history.

(56) References Cited

U.S. PATENT DOCUMENTS 6,646,975 B1 * 11/2003 Uchizaki et al. ............ 369/121

2003/0016614 A1 * 1/2003 Vo-Dinh ................. 369/112.15
2004/0212859 A1 * 10/2004 Tsukagoshi .................. 359/15

OTHER PUBLICATIONS

Horigome, H., et al. "Holographic Medium Will Achieve 200G Bytes in 2006," Nikkei Electronics, Jan. 17, 2005, pp. 105-114, with partial translation.

* cited by examiner

Primary Examiner—Joseph H Feild
Assistant Examiner—Joseph Haley
(74) Attorney, Agent, or Firm—Fitzpatrick, Cella, Harper & Scinto

(57) ABSTRACT

A servo controlling method for controlling an information processing apparatus using a hologram. The method includes a step of irradiating a holographic recording medium with light having a first wavelength and irradiating the holographic recording medium with light having a second wavelength, different from the first wavelength, a step of directing first return light by the light of the first wavelength and second return light by the light of the second wavelength to be incident on the same light receiving element, and a step of performing servo control by separating the first return light from the second return light at the light receiving element.

19 Claims, 7 Drawing Sheets

SERVO CONTROLLING METHOD OF OPTICAL INFORMATION PROCESSING APPARATUS AND OPTICAL INFORMATION RECORDING AND REPRODUCING APPARATUS

This application claims the benefit of Japanese Patent Application No. 2005-344370, filed on Nov. 29, 2005, the entire disclosure of which is incorporated herein by reference in its entirety.

BACKGROUND OF THE INVENTION

1. Field of the Invention

The present invention relates to an optical information reproducing method and an optical information recording and reproducing apparatus, for irradiating a hologram recording medium with an information beam and a reference beam to form an interference pattern, for recording information in the recording medium by the interference pattern, and for reproducing the information from the recording medium.

2. Description of the Related Art

Holographic recording, using holography and thereby recording information in a recording medium, is generally performed by overlapping an information beam having image information with a reference beam not having the image information in a recording medium, and writing an interference pattern prepared in this case in the recording medium. The recorded image information is reproduced by irradiating the reference beam to the recording medium and diffracting the reference beam by the interference pattern. By modulating the image information in accordance with the information to be recorded, it is possible to record optical information in the recording medium at a high density.

A holographic memory is described in, for example, Hideki Hirogome, et al., "Near Holographic Medium realizes 200G bytes in 2006 "NIKKEI ELECTRONIICS" No. 891, pages 105-114, Jan. 17, 2005". FIG. 14 is a conventional recording and reproducing apparatus using a holographic memory, which explains the optical system of a coaxial-type holographic memory system (optical information recording and reproducing apparatus) referred to as the colinear mode.

This optical information recording and reproducing apparatus records and reproduces information in and from a discoid hologram recording medium 216. Specifically, by irradiating the recording medium 216 with a signal beam modulated by information and a reference beam not modulated by information, at the same time, and making them interfere, a volume hologram is formed in the recording medium 216 to record information. Moreover, by irradiating the recording medium 216 with a weak reference beam, the reproduced image of a volume hologram is obtained, and information is reproduced. The volume hologram of the recording medium is a mode for positively using the thickness direction of the recording medium and, thereby, three-dimensionally writing an interference pattern. This is a mode for improving a diffraction efficiency and increasing a recording capacity, by using multiple recording. A digital volume hologram is a hologram recording mode restricting image information to be recorded to a binary digital pattern, while using a recording mode the same as in the case of a volume hologram.

The illustrated optical system is provided with a first light source 201 for generating a laser beam used to record and to reproduce information, a spatial light modulator (hereafter referred to as an SLM) 204 for modulating a signal beam, and a two-dimensional light receiving element 219 for detecting reproduced light.

An optical information recording and reproducing apparatus is provided with, not only the first light source 201 for recording and reproducing hologrammed optical information, but also, a second light source 220 constituted of a red laser, having no photosensitivity for the recording medium 216. It is possible to accurately detect the displacement of the recording medium 216 by using the second light source 220, and using the reflection film of the recording medium 216 as a reference plane. Thereby, even if side-runout or eccentricity occurs in the recording medium 216, it is possible to dynamically make a recording spot follow a recording medium plane, by using an optical servo technique, and to record an interference pattern at a high accuracy. This tracking is briefly described below.

The linear polarized-light flux emitted from the second light source 220, constituted of a red laser, or the like, passes through a beam splitter (hereafter, referred to as a BS) 221, is changed to a parallel light flux by a lens 222, reflected by a mirror 223 and a dichroic beam splitter (DBS) 211, and turned to the recording medium 216. The light flux passing through a quarter wave plate (QWP) 212 and converted into circular polarized light (for example, clockwise circular polarized light) is reflected from a mirror 213, enters an objective lens 214, and is collected by the reflection film of the recording medium 216 as a very small optical spot. The reflected light flux becomes counterclockwise circular polarized light, enters the objective lens 214 again, is changed to a parallel light flux, reflected from a mirror 213, passes through the QWP 212, and is converted into linear polarized light flux vertical to polarized light on an approach route. The light flux reflected by the DBS 211 passes through the mirror 223 and lens 222, similarly to the case of the approach route, is reflected by the BS 221 and led to a photodetector 224. The photodetector 224 has a plurality of light receiving planes to detect the positional information on a reflection plane. According to the detection result, it is possible to perform focus and tracking of the objective lens 214. This focus and tracking are the same as those performed in a conventionally-well-known optical information recording and reproducing apparatus using a CD or a DVD.

The above-described colinear-mode holographic memory system performs servo control, such as tracking, by using, not only a laser beam (e.g., a green laser beam from a first light source) having a relatively short wavelength for recording and reproducing the hologram, but also, a relatively-long-wavelength laser beam (e.g., a red laser beam from a second light source), in which a recording medium does not have photosensitivity. Therefore, even when executing optical servo, a hologram recording material is not photosensitized, and the recording-and-reproducing characteristic is not deteriorated. Moreover, the system dynamically follows the disturbance, such as eccentricity or side-runout, and can perform recording and reproducing at a high accuracy.

However, in the case of the above-described conventional optical-information recording and reproducing apparatus, a red-laser return beam for servo, including servo information, and a green laser return beam for recording and reproducing, including recorded information, are received by separate sensors. Therefore, the cost is increased due to the increase of the number of components, downsizing of an optical head is interrupted, the cost of the whole system is increased, and the whole apparatus is increased in size.

It is an object of the present invention to provide an optical information reproducing method capable of receiving a laser return beam for servo, including servo information and a laser return beam for recording and reproducing, including recorded information, by the same light receiving element and, thereby, realizing downsizing and cost reduction of an optical head.

It is another object of the present invention to provide an optical information recording and reproducing apparatus capable of receiving a laser return for servo, including servo information, and a laser return beam for recording and reproducing, including recorded information, by the same light receiving element and, thereby, realizing downsizing and cost reduction of an optical head.

SUMMARY OF THE INVENTION

An optical information recording and reproducing method of the present invention is an optical information reproducing method for reproducing information from a hologram recording medium having an information recording layer, in which information is recorded by using a hologram and a reflection film, in which servo information is recorded, in which an information recording layer in which a hologram is recorded is irradiated with light having a first wavelength, the reflection film is irradiated with light having a second wavelength different from the first wavelength, a hologram reproducing beam generated from an information recording layer by first-wavelength light and a servo information return beam generated from a reflection film by a second beam are made to enter the same light receiving element, and a hologram reproducing beam and a servo information return beam are separately detected by the light receiving element.

In the case of an optical information reproducing method of the present invention, it is preferable to use a light receiving element having a pixel in which a first filter for transmitting first-wavelength light is laminated, and a pixel in which a second film for transmitting second-wavelength light is laminated.

An optical information recording and reproducing apparatus of the present invention is an optical information recording and reproducing apparatus for recording and reproducing information in and from a hologram recording medium having an information recording layer, in which information is recorded by using a hologram, and a reflection film in which servo information is recorded, which is provided with an optical system for irradiating an information recording layer in which a hologram is recorded with first-wavelength light and irradiating a reflection film with the light having a second wavelength different from the first wavelength, a light receiving element having a first pixel group in which a filter for passing through the first-wavelength light is laminated and a second pixel group in which a filter for passing through second-wavelength light is laminated, and an optical system for making hologram reproducing light generated from an information recording layer by first-wavelength light and servo information return light generated from a reflection film by second light entering the light receiving element.

In the case of an optical information recording and reproducing apparatus of the present invention, it is preferable that a light receiving element is constituted as a single-plate area sensor. The single-plate area sensor is, for example, a CMOS sensor.

In the case of the present invention, it is only necessary to restore two-dimensional digital pattern information recorded in a recording medium in accordance with two-dimensional information generated by photoelectric-converting hologram reproducing light by a first pixel group (a pixel group in which a first color filter is laminated). Moreover, it is only necessary to detect a signal showing a servo pit in a recording medium in accordance with the sum of pixel information generated by photoelectric-converting servo information return light by a second pixel group (a pixel group in which a second color filter is laminated), to detect a focus error signal in accordance with the pixel information generated by photoelectric-converting servo information return light by the second pixel group and to detect a tracking error signal in accordance with the pixel information generated by photoelectric-converting servo information return light by the second pixel group.

Further features of the present invention will become apparent from the following description of exemplary embodiments, with reference to the attached drawings.

DESCRIPTION OF THE EMBODIMENTS

Figure 1:
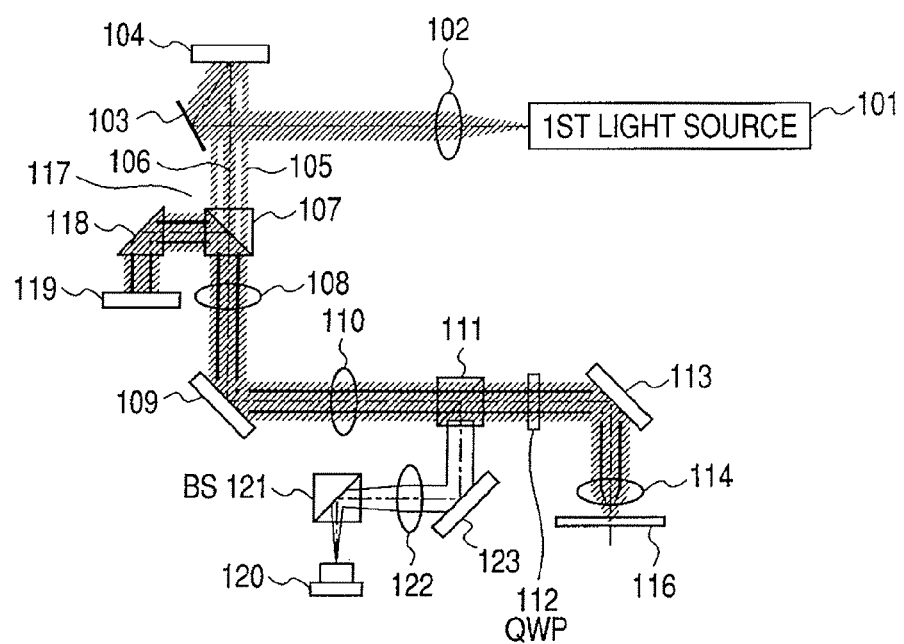
FIG. 1 is an illustration showing the optical system of the optical information recording and reproducing apparatus of an embodiment of the present invention.

Now, a preferred embodiment of the present invention is described by referring to the accompanying drawings. FIG. 1 is an illustration showing the configuration of the optical system of the optical information recording and reproducing apparatus of an embodiment of the present invention.

Figure 14:
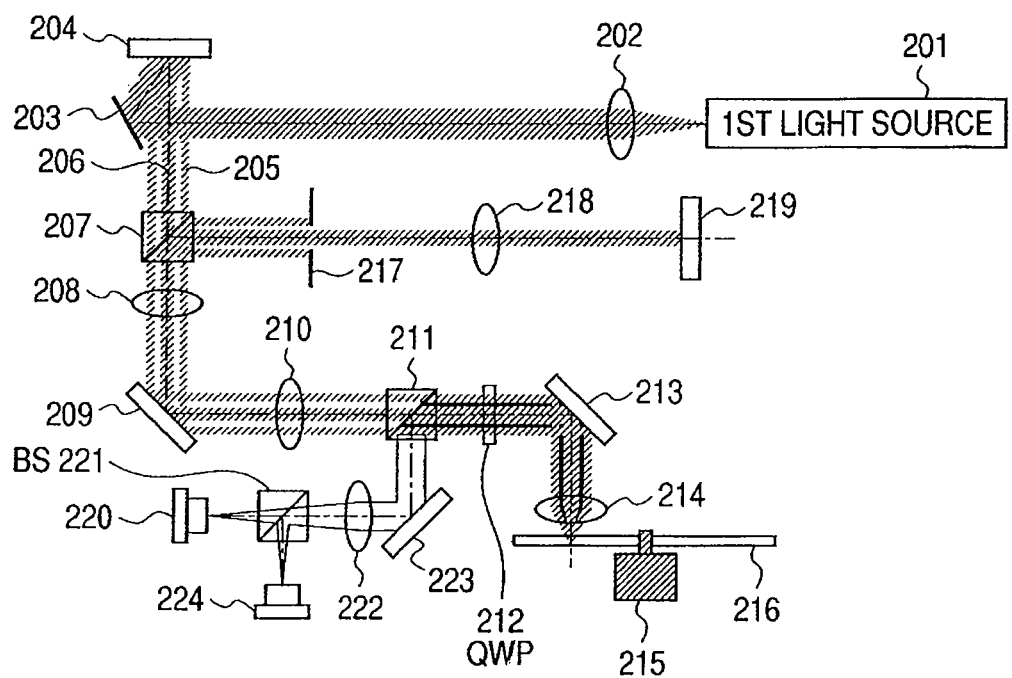
FIG. 14 is an illustration showing the outline of a conventional optical information recording apparatus using a holographic memory.

The optical system shown in FIG. 1 is one included in a coaxial holographic memory (colinear mode), which records and reproduces information in and from a discoid hologram recording medium 116. Moreover, similar to the configuration shown in FIG. 14, the optical system is provided with a first light source (green laser) 101 for generating a laser beam used to record and to reproduce information, a spatial optical modulating element SLM 104 for modulating a signal beam, and a light receiving element 119 for detecting a reproducing beam. The light receiving element 119 has a plurality of pixels two-dimensionally arranged as a single-plate area sensor. A MOS image sensor, or the like, is preferably used as the light receiving element 119. Moreover, this optical information recording and reproducing apparatus is provided with a second light source (red laser) 120 for optical servo. The optical information recording and reproducing apparatus shown in FIG. 1 is different from the apparatus shown in FIG. 14, in that a dichroic polarized beam splitter (hereafter referred to as a DPBS) 111 is used instead of a dichroic beam splitter (DBS) and a critical angle prism 118 is used. The critical angle prism 118 is set between a polarized beam splitter (hereafter referred to as a PBS) 107 and the light receiving element 119 constituted of a CMOS sensor, or the like. Moreover, the second light source 120 is set to the opposite side to the beam splitter (hereafter referred to as a BS) 121, differently from that shown in FIG. 14.

First, a case of recording data in the recording medium (hologram disk) 116 is described by using the above optical system.

A light flux emitted from the first light source 101, constituted of a green laser, or the like, is changed to a parallel light flux by a collimator 102, passes through a mirror 103, and illuminates the SLM 104. In the case of the object shown in FIG. 1, a DMD is used as the SLM 104. In the SLM 104, the light reflected by a pixel showing the information "1" is reflected in the direction of the recording medium 116 and the light reflected by a pixel showing the information "0" is not reflected in the direction of the recording medium 116. Because this apparatus uses a colinear mode, the central portion of the SLM 104 is used as a portion for modulating an information beam 106 and a portion for circularly surrounding the portion for modulating the information beam 106 serves as a portion for modulating a reference beam 105.

In the SLM 104, the information beam 106 and reference beam 105 reflected by the pixel showing the information "1" pass through the PBS 107 in the form of P polarized light. Then, the beams pass through a first relay lens 108, a mirror 109, a second relay lens 110 and DPBS 111, and are turned to the recording medium 116. After passing the DPBS 111, the reference beam 105 and information beam 106 pass through a quarter wavelength plate (hereafter referred to as QWP) 112 and are converted into circularly polarized light (for example, clockwise circularly polarized light), are reflected by a mirror 113 and enter an objective lens 114 having a focal distance F. A pattern displayed on the SLM 104 forms an intermediate image by two relay lenses 108 and 110 this side by focal distance F from the objective lens 114. Thereby, a 4F optical system is constituted, in which the pattern image (not shown) on the SLM 104, objective lens 114 and recording medium 116 are arranged separately by the distance F.

The discoid recording medium (hologram disk) 116 is rotatably held on a spindle motor (not illustrated). The reference beam 105 and information beam 106 are condensed on the recording medium 116 by the objective lens 114, and mutually interrupted to form an interference pattern. The interference pattern at the time of this recording is recorded in a macro molecular material in the recording medium 116 and, as a result, a digital volume hologram is formed. Moreover, a reflection film is set in the recording medium 116.

The second light source 120, constituted of a red laser having no photosensitivity for the recording medium 116, is set in addition to the first light source 101 for recording and reproducing hologrammed optical information. By using the second light source 120, it is possible to accurately detect the displacement of the recording medium 11 by using the reflection film of the recording medium 116 as a reference plane. The reflection film functions as a servo information recording layer. Thereby, even if side-runout or eccentricity occurs on the recording medium 116, it is possible to dynamically make a recording spot follow a recording medium plane by using an optical servo technique, and to accurately record an interference pattern. Tracking of this embodiment is described below.

The linear polarized light flux emitted from the second light source 102 is reflected by a beam splitter (hereafter referred to as a BS) 121 in the form of S polarized light, changed to parallel light flux by a lens 122, reflected by the mirror 123 and the DPBS 111 and turned to the recording medium 116. The light flux passing through the QWP 112 and converted into circular polarized light (for example, clockwise circular polarized light) is reflected by the mirror 113, enters the objective lens 114 and condensed by the reflection film of the recording medium 116 as a very-small optical spot. The reflected light flux becomes counterclockwise circular polarized light, enters the objective lens 114 again and changed to a parallel light flux, is reflected by the mirror 113, passes through the QWP 112 and is converted into linear polarized light flux vertical to polarized light on an approach route. The light flux passing through the DBSP 111 passes through the relay lens 110, mirror 109 and relay lens 108, and is reflected by the PBS 107 and critical-angle prism 118, and is led to the light receiving element 119.

Now, a case of reproducing the information recorded in the recording medium 116 is described below, by using the above optical system. The light flux emitted from the first light source 101 illuminates the SLM 104, similar to the case of recording. At the time of reproducing, only a portion for modulating the reference beam 105 of the SLM 104 displays the information "1" and portions for modulating the information beam 106 all display the information "0". Therefore, only the light reflected by the pixel at the portion of the reference beam 105 is reflected in the direction of the recording medium 116, but the information beam 106 is not reflected in the direction of the recording medium 116.

The reference beam 105 is condensed to the recording medium 116 in the form of circular polarized light (for example, clockwise circular polarized light) to reproduce an information beam from a recorded interference pattern (digital volume hologram). The information beam reflected by the reflection film in the recording medium 116 becomes counterclockwise circular polarized light, enters the objective lens 114 again, and is changed to a parallel light flux, reflected by the mirror 113, passes through the QWP 112 and converted into linear polarized light flux (S polarized light) vertical to the polarized light, in an approach route. In this case, the intermediate image of a display pattern of the SLM 104 reproduced at a distance F from the objective lens 114 is formed.

The light flux passing through the DPBS 111 passes through the relay lens 110, mirror 109 and relay lens 108, and is turned to the PBS 107. The light flux reflected by the PBS 107 is reflected by the critical-angle prism 118 to form an SLM display pattern, including only the portion of an information beam on the light receiving element 119.

Thus, in the case of this embodiment, a red laser beam for optical servo and a green laser beam for reproducing information are received by the same light receiving element 119. In the case of this embodiment, the optical servo using a red laser beam emitted from the second light source 120 is naturally performed, not only when reproducing information, but also, when recording information in the recording medium 116. At least the red laser beam reaches the light receiving element 119, similar to the above case, also, when recording information. Therefore, it is only necessary to perform servo control in accordance with the red laser beam reaching the light receiving element 19.

Figure 2:
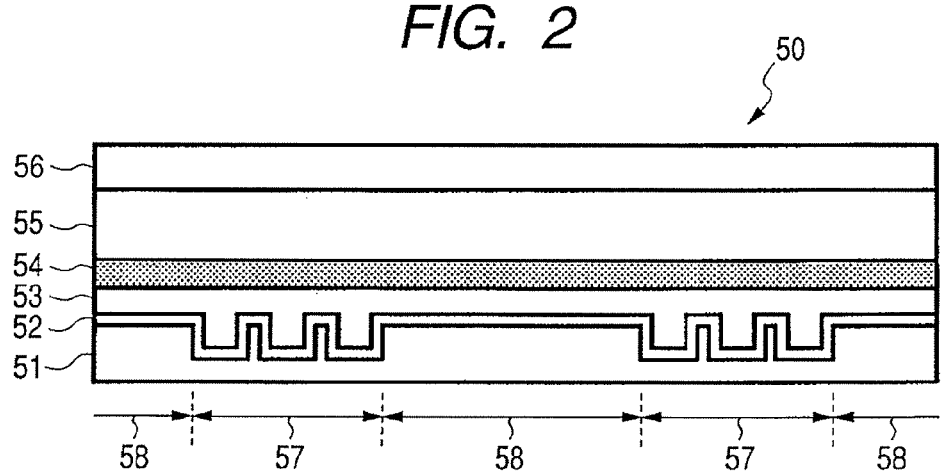
FIG. 2 is a schematic sectional view showing the configuration of a hologram recording medium.

The hologram recording medium of this embodiment is described below by referring to FIG. 2.

This hologram recording medium 50 is constituted by laminating a cover layer 56 of a transparent substrate, hologram recording layer 55, wavelength selecting reflection film 54, a gap layer 53 and preformat substrate 51. The preformat substrate 51 is a discoid substrate formed of polycarbonate or glass.

An address servo area 57 serving as a plurality of positioning regions linearly extended in the radius direction is formed at predetermined angle intervals on the preformat substrate 51, and the sector section between adjacent address servo areas serves as a data area 58. A reflection film 52 coated with gold or platinum is set on the preformat substrate 51. Servo information is held by the irregularity of the preformat substrate and a reflection film. The red laser beam passing through the wavelength selecting reflection film 54 is reflected by the reflection film 52 on the address servo area 57 formed on the phase pit, groove, and land forming portion formed on the preformat substrate 17, to become return light. The reflected light quantity due to diffraction of light is greatly changed, depending on the presence or absence of the phase pit, groove and land. It is possible to use the change of the return light as a signal, to generate a focus error signal, a tracking error signal and an address signal (to be described later), and to perform positioning control of an optical head, and recording position control of hologram recording information. The wavelength selecting reflection film 54 passes a red laser beam for obtaining address servo information, and a blue laser beam contributing to recording and reproducing is reflected.

The hologram material of the hologram recording layer 55 is not photosensitive for red light. Therefore, even if a red laser beam for servo passes through the hologram recording layer 55 or is reflected from the reflection film 52, the hologram recording layer 55 is not influenced. The hologram recording layer 55 is formed of a hologram material whose optical characteristics, such as refractive index, dielectric constant and reflectance, are changed by the light-intensity distribution of an interference pattern generated by the interference between an information beam and a reference beam. That is, the hologram recording layer 55 holds the interference pattern generated by recording information light as a change of optical characteristics. The gap layer 53 protects the reflection film 52 and has a function for keeping the interference region in the hologram recording layer 55 at a certain size, by forming a gap between the hologram recording layer 55 and the reflection film 52.

As described above, in the case of this optical information recording and reproducing apparatus, the light receiving element 119 simultaneously receives, for example, the light for optical servo, which is red light and the light for reproducing information, which is green light. In this case, it is necessary to separately obtain a signal to be obtained for optical servo and a signal for reproducing information. Therefore, a pixel having a red filter and a pixel having a green filter are arranged in a two-dimensional light receiving element, so that both signals can be separately obtained.

Figure 3:
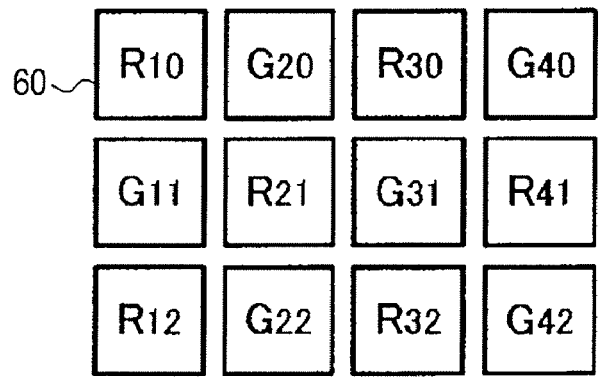
FIG. 3 is an illustration showing the arrangement of color filters in the light receiving pixel area of a light receiving element.

An example of the arrangement of color filters of a light-receiving pixel area of the light receiving element (MOS sensor) 119 in this embodiment is described below by referring to FIG. 3. FIG. 3 is an illustration showing a light receiving area for four pixels in the horizontal direction of the light receiving element 219, and four pixels in the vertical direction of the element 219 by enlarging the area. Square regions 60 in FIG. 3 respectively show a light receiving area for one pixel. Color filters for selectively passing light in accordance with the difference between wavelengths of the light are laminated on the light receiving portion of a photodiode for receiving and photoelectric-converting light to accumulate optical electrical charges, and FIG. 3 shows the two-dimensional arrangement of a color filter. An R pixel group R10, R30, R21, R41, R12 and R32 is a light receiving portion, in which R color filters passing the light having a red wavelength are laminated. In the case of the R pixel group, the return light of a red laser for servo reflected from a reflection film on the preformat substrate of a hologram recording medium passes, but the return light of a green laser for recording and reproducing reflected from a wavelength selecting reflection film is cut off. Therefore, only the pixel signal of red laser return light for servo is output from the R pixel group. However, the G pixel group of G20, G40, G11, G31, G22 and G42 is a light receiving portion in which G color filters for transmitting green-wavelength light are laminated. The G pixel group transmits a hologram recording layer of a hologram recording medium, the return light of a green laser for recording and reproducing reflected by a wavelength selecting reflection film is transmitted, and the return light of a red laser for servo reflected by the reflection film is cut off. Therefore, only the pixel signal of the green laser return light for recording and reproducing is output form the G pixel group.

Figure 4:
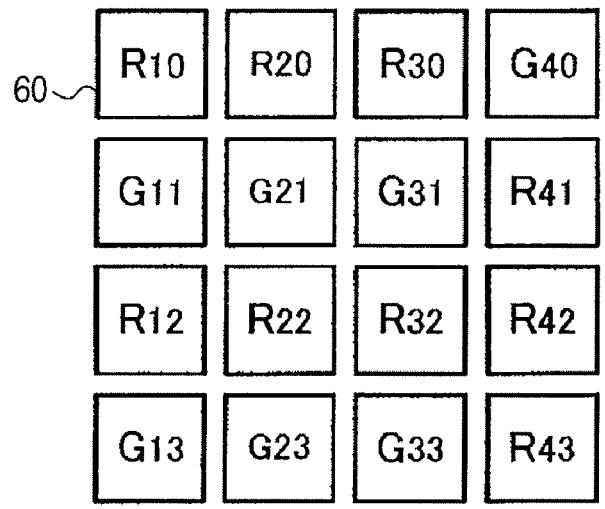
FIG. 4 is an illustration showing another arrangement of color filters in the light receiving pixel area of a light receiving element.
Figure 5:
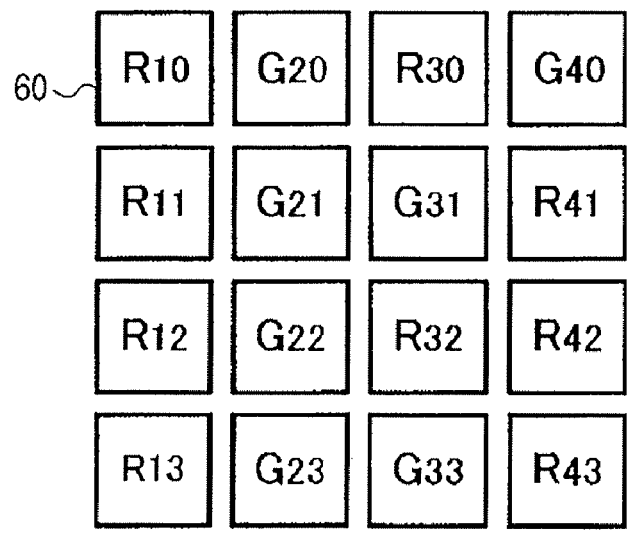
FIG. 5 is an illustration showing still another arrangement of color filters in the light receiving pixel area of a light receiving element.

The arrangement of the color filters shown in FIG. 3 is a mosaic arrangement, in which other color filters are arranged. However, the present invention is not restricted to the above case. FIGS. 4 and 5 show other examples of color filter arrangements. The arrangement of color filters in FIG. 4 is an arrangement in which a color transmitted by a color filter is changed for each row, and pixel signals having the same color component are reproduced from each horizontal line. FIG. 5 is an arrangement in which a color transmitted by a color filter is changed for each column, and pixel signals having the same color component are reproduced from vertical lines.

Figure 6:
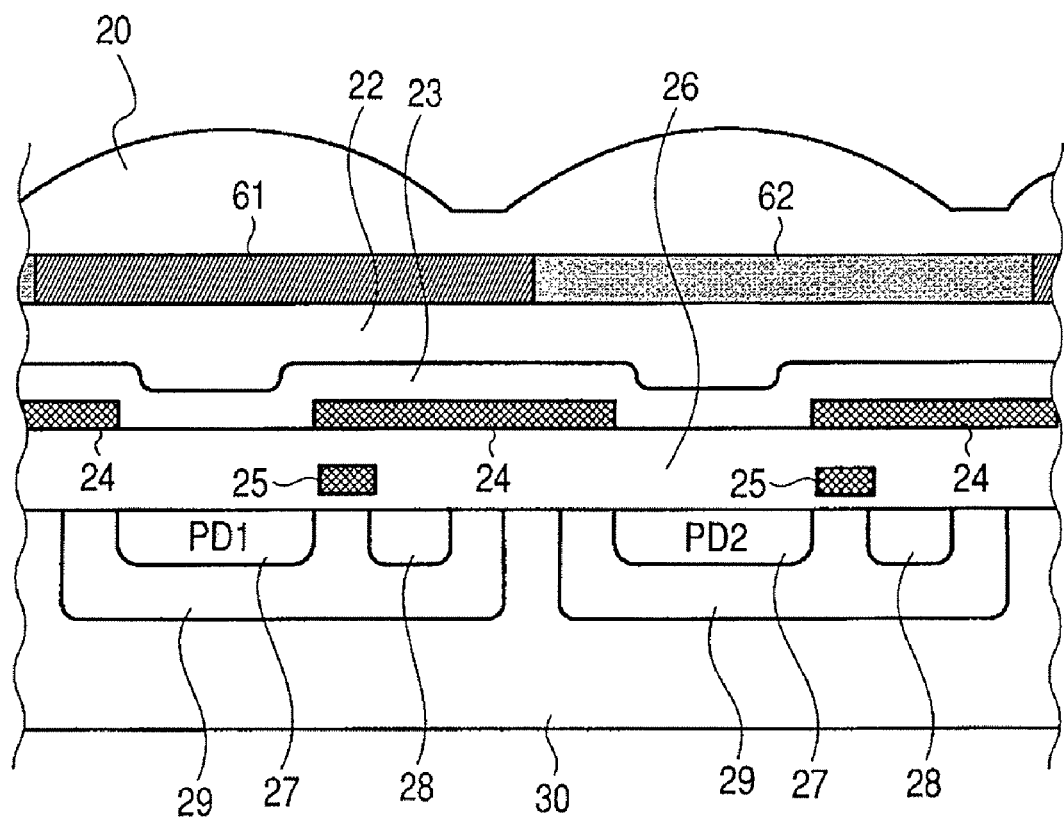
FIG. 6 is a sectional view showing the configuration of a pixel portion including color filters of a light receiving element.

The structure of the light receiving element 119 is more minutely described below. FIG. 6 is a longitudinal-directional sectional view showing the configuration of a pixel portion, including a color filter.

The light receiving element 119 is formed as a two-dimensional image sensor on, for example, a silicon substrate. In this case, it is assumed that an N-type semiconductor substrate is used. A P-type semiconductor region 29, serving as a region in which one pixel portion is formed, is formed on an N-type substrate 30, and an N-type semiconductor region 27 constituting a photodiode is formed in the P-type semiconductor region 29. In this case, the P-type semiconductor region is illustrated as a plurality of regions. However, it allows that the region becomes a common region for a plurality of photodiodes. In the photodiodes PD1 and PD2, optical electrical charges are generated in accordance with received light and accumulated in the N-type semiconductor region 27. The gate 25 of a MOS transistor for transfer is set to transfer optical electrical charges accumulated in the photodiodes PD1 and PD2 to the floating diffusion region 28. Optical electrical charges transferred to a floating diffusion region 28 are converted into pixel signals and read. The floating diffusion region is constituted of an N-type semiconductor region.

A light-shielding film 24, formed of aluminum, is formed on an inter-layer insulating film 26, so that light does not enter portions other than the light receiving portions of the photodiodes PD1 and PD2. The light-shielding film 24 transmits incident light to the photodiode light receiving portion, but it reflects light by portions other than the photodiode light receiving portion. A flattening layer 22 is formed on the light-shielding film 24 through a passivation layer 23.

A color filter and microlens 20 are formed on the flattening layer 22. Symbol 61 denotes an R color filter for passing red light. The R color filter 61 prevents the light having a wavelength other than red from passing, transmits the red-laser return light for servo and forms an optical spot on the photodiode PD1. Symbol 62 denotes a G color filter passing green light. The G color filter 62 passes green-laser return light for recording and reproducing, and forms an optical spot on the photodiode PD2.

The microlens 20 is used according to necessity, and has a function for efficiently condensing the light incoming to a pixel portion on a photodiode. The red laser return light for servo, condensed by the microlens 20 and passing through the R color filter 61, is received and accumulated by the photodiode portion PD1 and read. Green laser return light, condensed by the microlens 20 and passing through the G color filter 62, is received and accumulated by the photodiode portion PD2 and read. Thus, in the case of this embodiment, a red or green color filter is set on a photodiode. Thereby, the single light-receiving element 119 does not require a complex optical system, and can separately reproduce the red laser return light for servo and green laser return light for recording and reproducing.

Figure 7:
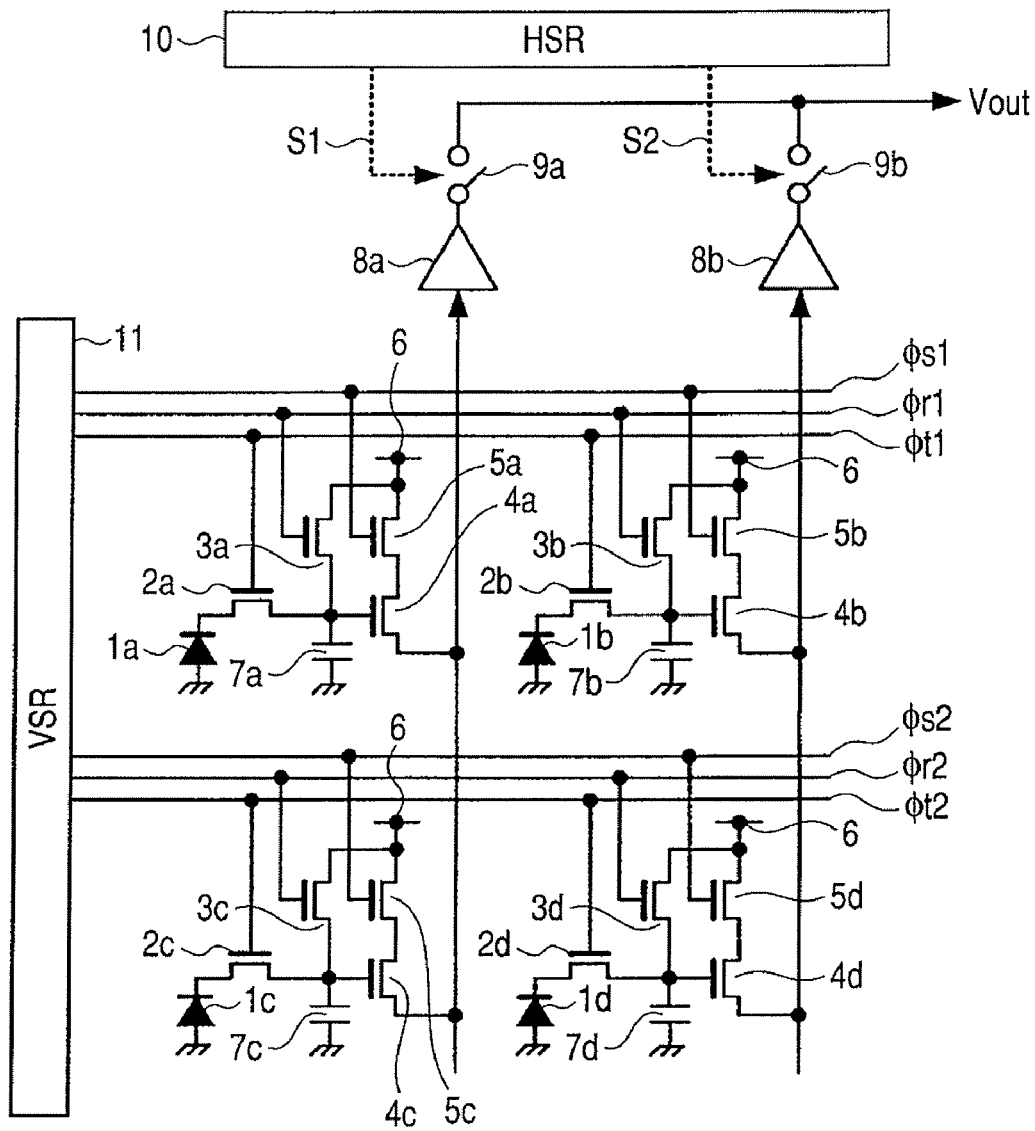
FIG. 7 is an equivalent circuit diagram of a light receiving element.

Then, the equivalent circuit of the light receiving element 119 constituted of a MOS sensor is shown in FIG. 7, and the read operation of a pixel signal is described below. The reset, accumulation, and read controls are performed for every line by a vertical shift register (VSR) 11. The reset, accumulation, and read controls are performed for every line by a vertical shift register (VSR) 11 for generating a driving pulse for selecting a horizontal line for reading a pixel signal. The VSR 11 performs reset, accumulation and read controls of the first-line pixels by making signal lines Fs1, Ft1 and Fr1 active. The VSR 11 performs reset, accumulation and read controls of the first-line pixels by making signal lines Ps2, Pt2 and Pr2 active and then performs reset, accumulation and read controls of the second-line pixels by making signal lines Fs2, Ft2 and Fr2 active. FIG. 7 shows a case of two horizontal pixels and two vertical pixels for the sake of convenience of explanation. However, the number of pixels is not restricted to the above case. The VSR 11 asserts Fs1 in order to read optical electrical charges accumulated in photodiodes 1a and 1b arranged on the first row, and make source-follower MOS transistors read 4a and 4b active. The VSR 11 asserts Fs1, makes the MOS transistors select 5a and 5b active and makes source-follower MOS transistors 3a and 3b active, in order to read optical electrical charges accumulated in photodiodes 1a and 1b arranged on the first row, and makes source-follower MOS transistors read 4a and 4b. Then, the VSR 11 asserts Fr1, makes MOS transistors reset 3a and 3b active and resets potentials of floating diffusion regions (capacities) 7a and 7b to power a supply voltage 6. After a reset operation is completed, the VSR 11 de-asserts Fr1. Reset noises generated in this case are accumulated in the floating diffusion regions 7a and 7b together with random noises. The noise components are read through source follower MOS transistors for reading 4a and 4b and held in amplifiers 8a and 8b or a memory (not shown). Then, the VSR 11 asserts Ft1, makes MOS transistors for transferring 2a and 2b active and transfers optical electrical charges accumulated in photodiodes 1a and 1b to floating diffusion regions 7a and 7b. Because optical electrical charges are transferred, potentials of the floating diffusion regions 7a and 7b are changed in accordance with the quantity of transferred optical electrical charges. This change value is a pixel signal and is held in amplifiers 8a and 8b or the memory (not shown) through source follower MOS transistors for reading 4a and 4b. The amplifiers 8a and 8b respectively generate a high-S/N pixel signal canceling reset noises and random noises by subtracting the previously-held device signal from a pixel signal.

A horizontal shift register (HSR) 10 sequentially asserts signal lines S1 and S2, makes switches 9a and 9b sequentially active, and thereby, sequentially outputs pixel signal outputs of amplifiers 8a and 8b, to an output line Vout. By this operation, selected first-line pixels are sequentially accessed from the output line Vout. In this case, it is assumed that R color filters are laminated on the photodiode 1a and G color filters are laminated on the photodiode 1b. The value of red laser return light for servo of the amplifier 8a, that is, servo signal and the value of laser return light for recording and reproducing signals, are sequentially read and output to the output line Vout by the HSR 10.

To read optical electrical charges accumulated in the second-row photodiodes 1c and 1d, after reading all pixel signals on the first row from the output line Vout, the VSR 11 makes Fs2, Ft2 and Fr2 active. Then, the VSR 11 asserts Fs2, makes MOS transistors for selecting 5c and 5d active, and makes source follower MOS transistors for reading 4c and 4d active. Then, the VSR 11 asserts Fr2, makes the MOS transistors for resetting 3c and 3d active and resets potentials of floating diffusion regions 7c and 7d to the power supply voltage 6. After a reset operation is completed, the VSR 11 de-asserts Fr2. Reset noises generated in this case are accumulated in floating diffusion regions 7c and 7d together with random noises. The noise component is read through the source follower MOS transistors for reading 4c and 4d, and held in the amplifiers 8a and 8b or the memory (not shown). Then, the VSR 11 asserts Ft2, makes the MOS transistors for transferring 2c and 2d active and transfers optical electrical charges accumulated in the photodiodes 1c and 1d to the floating diffusion regions 7c and 7d. Because optical electrical charges are transferred, potentials of the floating diffusion regions 7c and 7d are changed in accordance with the transferred quantity of electrical charges. This change quantity is a pixel signal, and is held in the amplifiers 8a and 8b or the memory (not shown) through the source follower MOS transistors for reading 4c and 4d. The amplifiers 8a and 8b respectively generate a high-S/N pixel signal canceling reset noises and random noises, by subtracting a previously-held noise signal from a pixel signal.

Pixel signal outputs of the amplifiers 8a and 8b are sequentially output to the output line Vout by the HSR 10 in the second row, similar to the case of the first row. By this operation, selected first-row pixels are sequentially accessed from the output line Vout. In this case, it is assumed that R color filters are laminated on the photodiode 1c and G color filters are laminated on the photodiode 1d. Then, the value of red laser return light for servo of the amplifier 8a, that is, a servo signal and the value of green laser return light for recording and reproducing of the amplifier 8b, that is, a recording and reproducing signal, are read to the output line Vout and the results are output.

Figure 8:
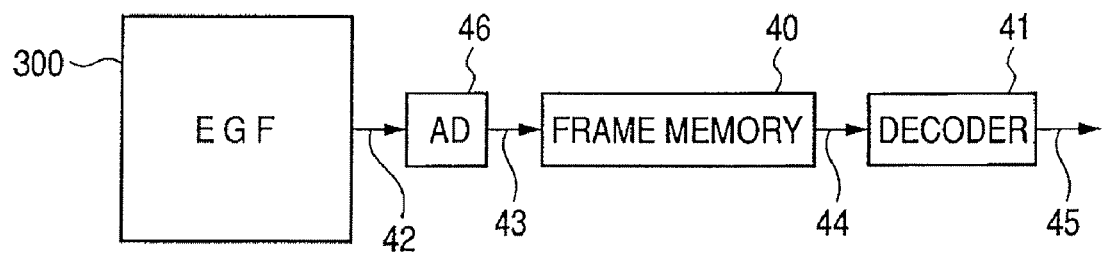
FIG. 8 is a block diagram showing a code system by recording information.

FIG. 8 shows a recorded information decoding system which irradiates the hologram recording layer of a recording medium with a green laser reference beam, reproduces a two-dimensional digital pattern recorded from the image information of a two-dimensional spatial light-intensity distribution reproduced by diffraction, and decodes the recorded information.

By irradiating the interference pattern recorded in the hologram recording layer of a recording medium with a reference beam by a green laser beam for recording and reproducing, a reproduced image of a digital volume hologram is obtained. This reproduced image reaches the light receiving area 300 of the light receiving element 119 as a two-dimensional image receiving the optical intensity modulation corresponding to two-dimensional digital symbols "1" and "0". Among all pixels constituting the light receiving area 300, G color filters are laminated, and a pixel obtained by photoelectrically converting only green laser return light for recording and reproducing is used as a G pixel. R color filters are accumulated, and a pixel photoelectrically converting only red laser return light for servo is used as an R pixel. Then, only the G pixel is used to reproduce a recorded information beam. In the light receiving area 300, only G pixels are sequentially read from an output line 42, quantized to the information of "1" or "0" by an AD (analog-digital) converter 46, and become a reproduced digital signal 43. The reproduced digital signal 43 for one pixel is stored in a frame memory 40 and reconstructed as a two-dimensional digital symbol image 44. The reconstructed two-dimensional digital symbol image 44 is demodulated by a decoder 41 and, as a result, recorded information in a recording medium is reproduced as digital information of "1" and "0".

Figure 9:
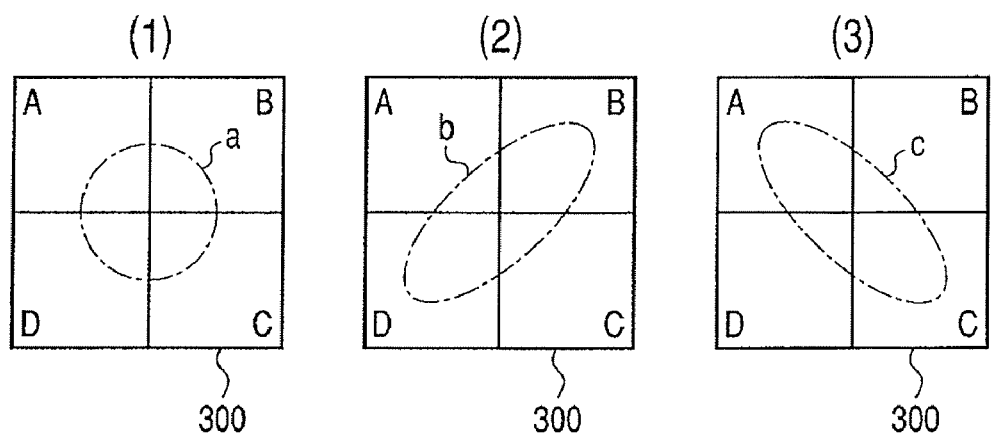
FIG. 9 is an illustration showing the principle of focus control.

Now, the principle of focus control in this embodiment is described by referring to FIG. 9. As a mode for performing focus control, an astigmatic method, a knife edge method or a critical angle method is known. Although this embodiment uses the astigmatic method, it is possible to use focus control of other methods.

A red laser beam passing through the hologram recording layer of a hologram recording medium, and reflected by the reflection layer of a preformat substrate, passes through a cylindrical lens, and is received by the light receiving element 119. Because the red laser beam passes through the cylindrical lens, it is possible to provide astigmatism for the red laser beam. The entire light receiving area 300 of the light receiving element 119 is divided into four regions of A, B, C, and D, as illustrated, and uses the sum total of R pixel signals in each region as the output of each light receiving area.

The shape of the image spot of a red laser beam for servo, having astigmatism on the light receiving element 119, becomes an alternate long and short dash line a shown in (1) of FIG. 9 when a disk position is present at the focus position of an object lens (focus). However, when the disk position is too far from the objective lens (defocus), the disk position is shown by the alternate long and short dash line b in (2) of FIG. 9. When the disk position is too close to the object lens (defocus), it is shown by the alternate long and short dash line c in (3) of FIG. 9. Therefore, by controlling the position of the objective lens so that the difference between the sum total of R pixel signals of light receiving areas A and C and the sum total of R pixel signals of the light receiving areas B and D becomes zero, it is possible to keep a focus state.

Figure 10:
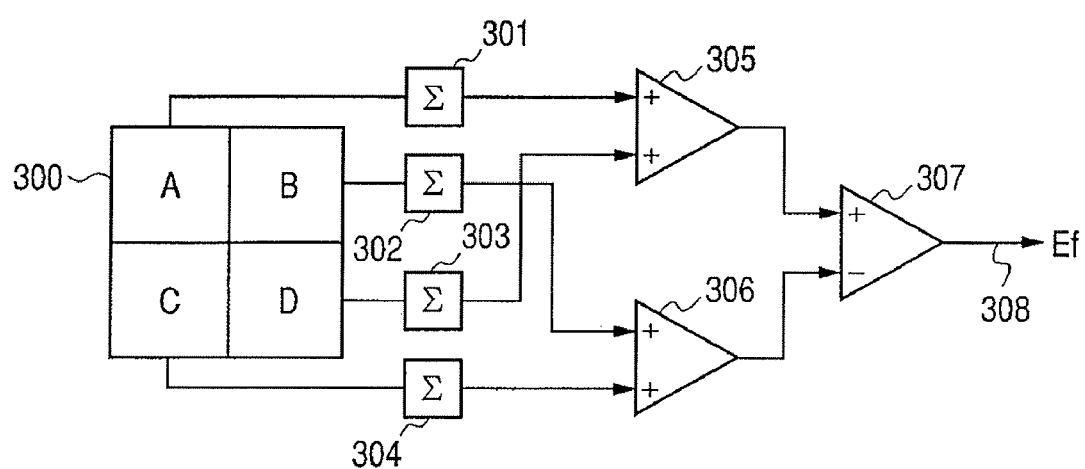
FIG. 10 is a block diagram showing a focus-error-signal generating system.

FIG. 10 shows a system for generating a focus error signal Ef used to control the position of the objective lens. In the case of the focus error signal generating system, the total sum of R pixel signals in a light receiving area A is calculated by an accumulator 301, the total sum of R pixel signals in the light receiving area C is calculated by an accumulator 303 and outputs of the accumulators 301 and 303 are added by an adder 305. Moreover, the total sum of R pixel signals in a light receiving area B is calculated by an accumulator 302, the total sum of R pixel signals in a light receiving area D is calculated by an accumulator 304 and outputs of the accumulators 302 and 304 are added by an adder 306. A differential computing unit 307 calculates the difference between outputs of adders 305 and 306. The output 308 of the differential computing unit 307 becomes a focus error signal Ef. The focus error signal Ef has the so-called S-character characteristic on the relative positional relation between an objective lens and a disk position. By controlling the current of an objective-lens-driving focus coil in accordance with the polarity or size of the focus coil in accordance with the polarity or size of the focus error signal Ef, it is possible to control a disk position so that an objective lens is always brought to a focus position. Specifically, the position of the objective lens is controlled by a servo loop, so that the focus error signal Ef becomes zero.

Figure 11:
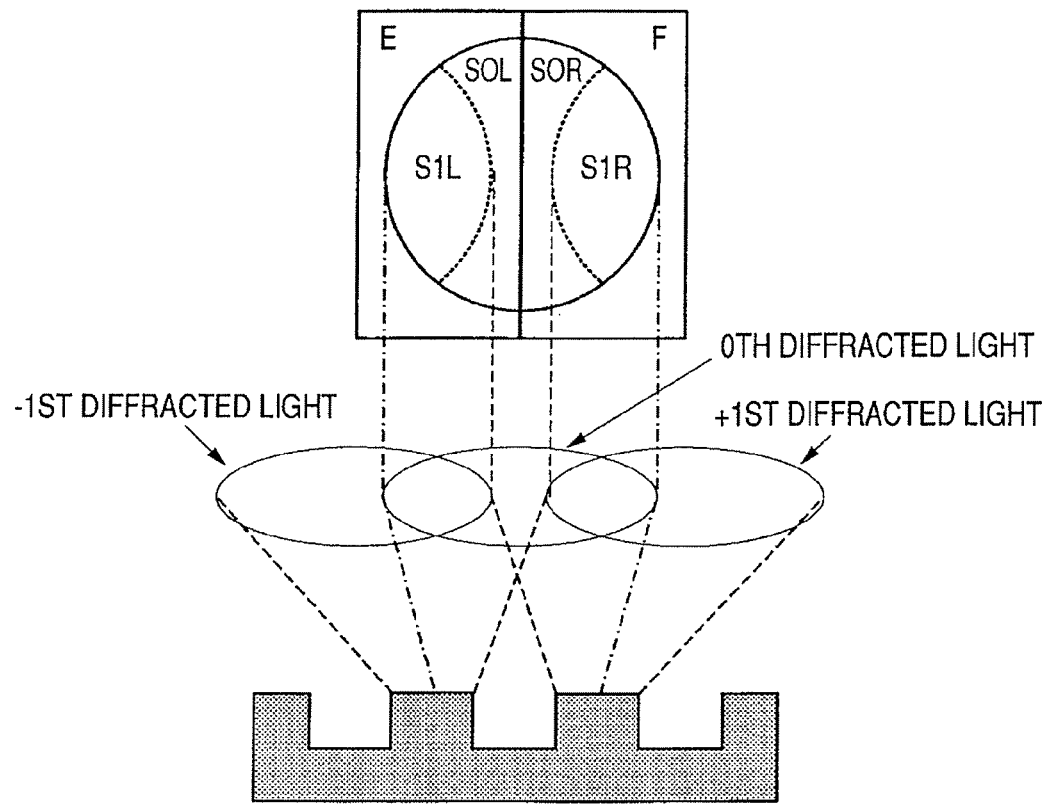
FIG. 11 is an illustration showing the principle of tracking control.

The principle of tracking control in this embodiment is described below by referring to FIG. 11.

A land serving as a track portion for recording information is spirally formed on the discoid holographic recording medium on the preformat substrate of a holographic recording medium. Moreover, a groove serving as a guide groove is formed on the preformat substrate so as to hold the land. Tracking control is control for a laser beam spot to accurately trace the land. This embodiment executes tracking control using the push-pull method.

The push-pull method of this embodiment divides the entire light-receiving area 300 of the light receiving element 119 for receiving a red laser beam for servo reflected and diffracted in a group into two areas, such as light receiving areas E and F. Then, by obtaining the difference between total sums of R pixel signals in each light receiving area, a tracking error signal Et is generated. The red laser beam for servo passing through a hologram recording layer and wavelength selecting reflection film in the recording medium is imaged on the recording track portion of a preformat substrate. Return light is reflected by the land, and a group portion reaches the light receiving element 119 in the forms of 0th diffracted light, which is regular reflected light, +1st light and −1st diffracted lights. The 0th diffracted light and ±1st diffracted lights cause interference on the light receiving plane of the light receiving element 119 to decrease the light intensity of an interference portion. As a result, an interference portion is generated at the line-symmetric position centering around 0th diffracted light. In the light receiving area E, a region S0L, in which only 0th diffracted light is present, and a region S1L, which is an interference portion with −1st diffracted light, are formed. Similarly, in the light receiving area F, a region S0R in which only 0th diffracted light is present, and a region S1R, which is an interference portion with ±1st diffracted light, are formed. When an imaging spot is located at the center of a land (recording track portion), light intensity balance between the interference portions S1L and S1R is kept. That is, light intensities of two light receiving areas E an F on both sides of the line-symmetric central line equals each other. In this case, the total sum of R pixel signals of the light receiving area E is equal to the total sum of R pixel signals of the light receiving area F and the difference between the total sums becomes zero. However, when the imaging spot is deviated from the central portion of the land, the balance between light intensities of the interference portions S1L and S1R is broken, and the difference between total sums of R pixel signals of the light receiving areas E and F does not become zero. The difference component serves as a tracking error signal Et showing a displacement from a recording track.

Figure 12:
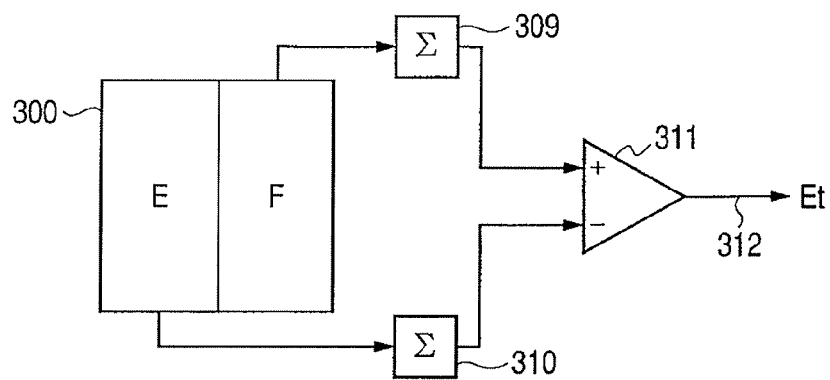
FIG. 12 is a block diagram showing a tracking-error-signal generating system.

FIG. 12 shows a system for generating the tracking error signal Et. The tracking-error-signal generating system calculates the total sum of R pixel signals in the light receiving area E by an accumulator 309, calculates the total sum of R pixel signals in the light receiving area F by the accumulator 310 and obtains the difference between outputs of the accumulators 309 and 310 by a differential operational unit 311. The output 312 of the differential operational unit 311 becomes the tracking error signal Et. By controlling the current of a tracking coil for driving an objective lens in accordance with the polarity or size of a tracking error signal Et 312, an imaging spot on a holographic recording medium is controlled so as to be traced by always following the recording track center. Specifically, the position of an objective lens is controlled by a servo loop, so that the tracking error signal Et becomes zero.

Figure 13:
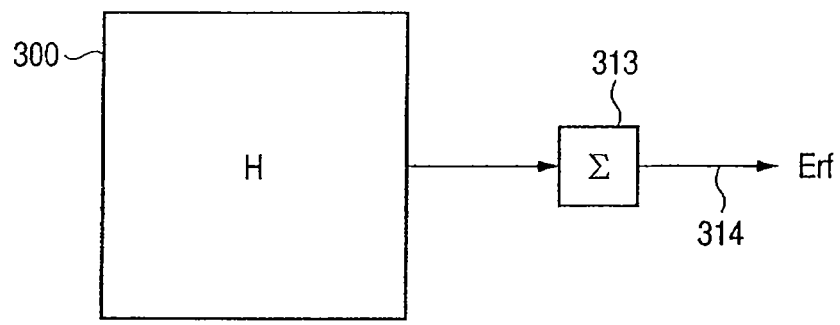
FIG. 13 is a block diagram showing an address-signal generating system.

A mode for reproducing address information in this embodiment is described below by referring to FIG. 13. Track address information is previously written in the preformat substrate of a holographic recording medium and, by reading the track address information, it is possible to make an access to a desired position of the recording medium. The track address information is written in a phase pit (groove trench on a recording track) in an address servo area.

It is assumed that the spot of a red laser beam for servo can accurately trace a recording track in accordance with the above-described focus control and tracking control. When the spot of the red laser beam traces the phase pit, in which track address information is written, the laser beam is diffused due to diffraction and return light is suddenly decreased where the phase pit is present. By detecting the change of the light as a signal, the address mark, track address information and data write position deciding clock previously written in the preformat substrate are reproduced. The address mark is a pattern embedded in the top of an address, and it is possible to determine the present position of address information by detecting the address mark.

After detecting the address mark, the address information present at a predetermined position is reproduced. A predetermined number of reference clocks are present after the address information, and by reproducing the reference clocks and making the clocks synchronize with a PLL (phase synchronizing loop), it is possible to accurately control the position of the hologram record of a data area. FIG. 13 shows a system for generating this address signal. The address signal generating system reads only an R pixel in the light receiving area 300 of the light receiving element 119, and obtains the total sum for one pixel by the accumulator 313. That is, address information is specified from a change in light quantity of the whole red laser beam optical spot on the light receiving portion 300. The total sum 314 of R pixel outputs of the accumulator 313 becomes a reproduced address signal Erf.

As described above, this embodiment receives red laser return light, including servo information, and green laser light for recording and reproducing, including recorded information, by the same light receiving element. In this case, the servo information includes, for example, a focus error signal, a tracking error signal and a reproduced address signal. The recorded information is a two-dimensional light-intensity-distribution image reproduced when irradiating a hologram recording layer with a reference beam. Then, the red laser return light for servo and green laser return light for recording and reproducing are separated from each other by an on-chip color filter on the receiving pixels of the light receiving element. Thereby, it is possible to extract servo information or address information from the red laser return light for servo and recorded information from the green laser return light for recording and reproducing using a single light receiving element.

While the present invention has been described with reference to exemplary embodiments, it is to be understood that the invention is not limited to the disclosed exemplary embodiments. The scope of the following claims is to be accorded the broadest interpretation, so as to encompass all such modifications and equivalent structures and functions.

What is claimed is:

1. A method of (a) effecting at least one of recording information on and reproducing information from a holographic recording medium and (b) performing servo control of an information recording and/or reproducing apparatus, said method comprising:

generating a light beam having a first wavelength for effecting the at least one of recording of information on and reproducing information from the holographic recording medium;

passing the light beam having the first wavelength through a dichroic polarized beamsplitter, which polarizes the light beam;

irradiating the holographic recording medium with the polarized light beam having the first wavelength;

generating a light beam having a second wavelength, different from the first wavelength, for performing servo control;

reflecting the light beam having the second wavelength off of the dichroic polarized beamsplitter;

irradiating the holographic recording medium with the light beam having the second wavelength reflected off of the dichroic polarized beamsplitter;

reflecting (i) a first return light beam from the holographic recording medium, the first return light beam having the first wavelength, and (ii) a second return light beam from the holographic recording medium, the second return light beam having the second wavelength;

directing the reflected first return light beam and the second return light beam to pass through the dichroic polarized beamsplitter;

reflecting the first and second return light beams, having passed through the dichroic polarized beamsplitter, by a critical angle prism;

causing the first and second return light beams reflected by the critical angle prism to be incident on the same light receiving element;

separating signals from the light receiving element, a first signal representing recording and/or reproducing information and a second signal provided for performing servo control of the recording and/or reproducing apparatus; and performing servo control of the recording and/or reproducing apparatus based on the second signal.

2. The method according to claim 1, wherein the servo control is tracking control.

3. The method according to claim 1, wherein the servo control is focusing control.

4. A method of (a) effecting at least one of recording information on and reproducing information from a holographic recording medium and (b) performing servo control of an information recording and/or reproducing apparatus, said method comprising:

generating a light beam having a first wavelength for effecting the at least one of recording of information on and reproducing information from the holographic recording medium;

irradiating a holographic recording medium with the light beam having the first wavelength;

generating a light beam having a second wavelength, different from the first wavelength, for performing servo control;

irradiating the holographic recording medium with the light beam having the second wavelength;

reflecting (i) a first return light beam from the holographic recording medium, the first return light beam having the first wavelength, and (ii) a second return light beam from the holographic recording medium, the second return light beam having the second wavelength;

directing the reflected first return light beam and the second return light beam to pass through a dichroic polarized beamsplitter;

reflecting the first and second return light beams, having passed through the dichroic polarized beamsplitter, by a critical angle prism;

causing the first and second return light beams reflected by the critical angle prism to be incident on the same light receiving element;

separating signals from the light receiving element, a first signal representing recording and/or reproducing information and a second signal provided for performing servo control of the recording and/or reproducing apparatus; and performing servo control of the recording and/or reproducing apparatus based on the second signal.

5. The method according to claim 4, wherein the servo control is tracking control.

6. The method according to claim 4, wherein the servo control is focusing control.

7. An apparatus for (a) effecting at least one of recording information on and reproducing information from a holographic recording medium and (b) performing servo control of an information recording and/or reproducing apparatus, said apparatus comprising:

a first light source for (i) generating a light beam having a first wavelength for effecting the at least one of recording of information on and reproducing information from the holographic recording medium and (ii) irradiating the holographic recording medium with the light beam having the first wavelength;

a second light source for (i) generating a light beam having a second wavelength, different from the first wavelength, for performing servo control and (ii) irradiating the holographic recording medium with the light beam having the second wavelength;

a dichroic polarized beamsplitter for passing (i) a first return light beam from the holographic recording medium, the first return light beam having the first wavelength and (ii) a second return light beam from the holographic recording medium, the second return light beam having the second wavelength;

a critical angle prism for reflecting the first return light beam and the second return light beam, having passed through the dichroic polarized beamsplitter, to be incident on the same light receiving element;

a light receiving element comprising (i) a first pixel group for receiving the first return light beam reflected by the critical angle prism and for generating a first signal representing recording and/or reproducing information and (ii) a second pixel group for receiving the second return light beam reflected by the critical angle prism and for generating a second signal for performing servo control of the recording and/or reproducing apparatus; and an optical servo for performing servo control of the recording and/or reproducing apparatus based on the second signal.

8. The apparatus according to claim 7, wherein the holographic recording medium comprises a first layer containing information recorded by using a hologram and a second layer containing servo information.

9. The apparatus according to claim 7, wherein the first pixel group comprises a filter for passing the light of the first wavelength and the second pixel group comprises a filter for passing the light of the second wavelength, wherein the first pixel group and the second pixel group are formed on a same semiconductor substrate.

10. The apparatus according to claim 7, wherein the light receiving element is a monolithic area sensor.

11. The apparatus according to claim 10, wherein the monolithic area sensor is a MOS sensor.

12. The apparatus according to claim 7, wherein the first pixel group photoelectrically generates two-dimensional information.

13. The apparatus according to claim 12, wherein the photoelectrically generated two-dimensional information is used for restoring two-dimensional digital pattern information recorded in the recording medium.

14. The apparatus according to claim 7, wherein the second pixel group photoelectrically generates two-dimensional information.

15. The apparatus according to claim 14, further comprising a detector for detecting a signal showing a servo pit in the recording medium by summing the photoelectrically generated two-dimensional information.

16. The apparatus according to claim 14, further comprising a generator for generating a focus error signal based on the photoelectrically generated two-dimensional information.

17. The apparatus according to claim 14, further comprising a generator for generating a tracking error signal based on the photoelectrically generated two-dimensional information.

18. The apparatus according to claim 7, wherein the dichroic polarized beamsplitter receives the light beam having the first wavelength and passes the first light beam therethrough to irradiate the holographic recording medium with the light beam having the first wavelength.

19. The apparatus according to claim 7, wherein the dichroic polarized beamsplitter receives the light beam having the second wavelength and reflects the second light beam to irradiate the holographic recording medium with the light beam having the second wavelength.

* * * * *